United States Patent [19]

Gadkaree et al.

[11] Patent Number: 4,769,346

[45] Date of Patent: Sep. 6, 1988

[54] WHISKER COMPOSITE CERAMICS FOR METAL EXTRUSION OR THE LIKE

[75] Inventors: Kishor P. Gadkaree, Big Flats; K. Pattabhirami Reddy, Corning, both of N.Y.

[73] Assignee: Corning Glass Works, Corning, N.Y.

[21] Appl. No.: 922,950

[22] Filed: Oct. 24, 1986

[51] Int. Cl.$^4$ .................. C04B 35/02; C04B 35/08; C03C 10/06

[52] U.S. Cl. .................. 501/9; 501/8; 501/32; 501/4; 501/94; 501/95; 501/108; 501/118; 501/122; 501/123; 501/153; 501/154; 264/DIG. 11; 72/467

[58] Field of Search .................. 501/94, 95, 4, 6, 8, 501/9, 153, 154; 72/253.1, 467

[56] References Cited

U.S. PATENT DOCUMENTS

| | | | |
|---|---|---|---|
| 3,365,317 | 1/1968 | Yavorsky | 501/104 |
| 3,791,799 | 2/1974 | Heitzinger | 72/467 |
| 4,033,779 | 7/1977 | Winkler | 501/119 |
| 4,145,910 | 3/1979 | Scheel | 72/467 |
| 4,364,760 | 12/1982 | Higuchi et al. | 501/118 |
| 4,403,017 | 9/1983 | Bind | 501/118 |
| 4,410,635 | 10/1983 | Brennan et al. | 501/9 |
| 4,464,192 | 8/1984 | Layden et al. | 501/95 |
| 4,468,947 | 9/1984 | Takeda et al. | 72/467 |
| 4,543,345 | 9/1985 | Wei | 501/95 |
| 4,576,919 | 3/1986 | Hodge | 501/9 |
| 4,588,699 | 5/1986 | Brennan et al. | 501/8 |
| 4,589,900 | 5/1986 | Brennan et al. | 501/8 |
| 4,594,106 | 6/1986 | Tauaka et al. | 427/423 |
| 4,615,987 | 10/1986 | Chyung et al. | 501/8 |
| 4,618,529 | 10/1986 | Yamamura | 428/260 |
| 4,640,830 | 2/1987 | Arakawa | 501/94 |
| 4,642,271 | 2/1987 | Rice | 428/378 |

FOREIGN PATENT DOCUMENTS

| | | | |
|---|---|---|---|
| 126017A | 11/1984 | European Pat. Off. | 501/95 |
| 2475534 | 8/1981 | France | 501/95 |
| 8095648 | 6/1983 | Japan | 501/95 |
| 0195064 | 10/1985 | Japan | 501/95 |
| 1122160 | 6/1986 | Japan | 501/95 |
| 954285 | 4/1964 | United Kingdom | 501/95 |

OTHER PUBLICATIONS

"Determination of Some Useful Properties of Partially Stabilized Zirconia and the Application to Extrusion Dies", Gulati et al., *Ceramic Bulletin*, vol. 59 (2), (1980), pp. 211-215.

*Primary Examiner*—William R. Dixon, Jr.
*Assistant Examiner*—Andrew B. Griffis
*Attorney, Agent, or Firm*—Kees van der Sterre

[57] ABSTRACT

A composite ceramic extrusion die consisting of a silicon carbide wisker-reinforced cordierite ceramic wherein the predominant matrix phase is cordierite or, preferably, barium-stuffed cordierite having a crystal compositon $xBaO.4MgO.(4+x)Al_2O_3.(10-2x)SiO_2$ wherein x ranges from zero up to about 0.5, such extrusion die exhibiting excellent durability under the conditions of non-ferrous metal alloy extrusion at temperatures of 700°-900° C., is described.

4 Claims, 1 Drawing Sheet

WHISKER COMPOSITE CERAMICS FOR METAL EXTRUSION OR THE LIKE

BACKGROUND OF THE INVENTION

The present invention is in the field of composite materials exhibiting improved fracture toughness and strength at high temperatures, and particularly relates to improved composite ceramic materials useful for high-temperature applications such as the high-pressure extrusion of ferrous or non-ferrous metals.

U.S. Pat. No. 3,365,317 describes metal extrusion dies exhibiting lubricity, toughness, abrasion resistance and chemical inertness formed of a magnesia stabilized zirconia composition. Such dies are intended for use at high pressures and at temperatures which may range as high as 1650°–2370° F.

Zirconia extrusion dies of the type described in the aforementioned patent have been commercially available for some time. For example an MgO-containing partially stabilized zirconia material commercially available as Corning Code 1027 zirconia has been utilized for many years to fabricate extrusion die nibs for the production of copper alloy rod.

Unfortunately, the partially stabilized zirconia materials which had been utilized for extrusion applications prior to the present invention had exhibited considerable variability in the toughness and resistance to cracking failure which they exhibited in actual use as an extrusion die. In some cases, the failure of one die from a die lot might occur after only a few extrusion runs, while another die from that lot might exhibit unexpectedly prolonged life under identical extrusion conditions. This behavior could be attributed to variability in the crystal phase makeup of the extrusion dies and/or to a lack of consistent die casing and extrusion practices. The precise crystal forms taken by zirconia depend strongly on the amount of stabilizer used, and on the thermal history of the partially stabilized zirconia product. A variety of crystal assemblages can be produced in a single nominally invariant composition using different firing schedules.

Attempts have recently been made to improve the performance of zirconia products for extrusion die applications by enhancing the toughness and/or strength of the material. Such attempts have included processing modifications such as thermal aging procedures by which the strength and toughness of zirconia products can be enhanced. However, such processing adds to the expense of the product.

A number of other ceramic materials are known which exhibit good high temperature stability and strength. Examples of such materials include the class of materials known as glass-ceramics, which are largely crystalline bodies produced by the controlled crystallization of glasses of appropriate compositions. U.S. Pat. No. 2,920,971 describes some early glass ceramic compositions exhibiting good high-temperature properties, and many other glass-ceramic compositions have been subsequently developed for various applications. Unfortunately, because of the presence of residual glassy phases therein, such materials are not expected to exhibit the high-temperature creep resistance necessary for metal extrusion applications. Such applications customarily demand die shape retention to maintain high dimensional tolerances on the extruded product.

Families of ceramic materials have also been considered for use in high temperature applications wherein toughness is required. In general, however, ceramic matrix materials entirely devoid of residual glassy phases do not exhibit high inherent toughness. Rather, these wholly crystalline assemblages are prone to cracking fatigue and breakage and provide a material wherein crack propagation e.g., between grains of the crystalline material is relatively easy. Thus it has been proposed to strengthen ceramic bodies with inorganic whiskers or fibers to enhance the strength and toughness thereof.

The use of strengthening strategies involving reinforcement by inorganic whiskers and fibers has been discussed by N. Claussen in "Strengthening Strategies for $ZrO_2$-toughened Ceramics at High Temperatures", *Materials Science and Engineering*, 71 (1985), pages 23–38. That article proposes that a number of whisker-toughened materials including cordierite, mullite, and zirconia would be useful subjects for exploratory studies in the area of reinforced ceramic composite materials.

In U.S. Pat. No. 4,464,192, products formed by molding processes are described which include a glass ceramic matrix composed of a lithium aluminosilicate, magnesium aluminosilicate or similar glass-ceramic material and a reinforcing chopped fiber or whisker phase composed of silicon carbide or the like. These materials are proposed for use, for example, as engine parts for high-temperature use.

In the copending commonly assigned patent application of K. C. Chyung et al., Ser. No. 723,572 filed Apr. 15, 1985, now U.S. Pat. No. 4,615,987, a family of whisker-reinforced alkaline earth aluminosilicate glass-ceramic materials comprising 10–60% by weight of a silicon carbide fiber or whisker reinforcement is described. These materials, which may contain principal crystal phases such as anorthite combined with mullite, cordierite, albite and/or barium osumilite, reportedly exhibit improved toughness (resistance to cracking) and good high temperature strength. However, reductions in strength and toughness were observed even in these materials at temperatures of 900° C. Moreover, the retention of glassy phases in these largely glass ceramic materials would be expected to significantly limit the high temperature creep resistance thereof.

Therefore, notwithstanding the various proposals for toughening glass and ceramic products, no commercially successful reinforced composite ceramic product has yet been developed for such high-temperature applications as die parts for metal extrusion processes or the like.

It is therefore a principal object of the present invention to provide a composition system particularly well suited for the fabrication of stress parts useful for high temperature applications. It is a further object of the invention to provide extrusion dies or similar components for metal forming composed of composite glass-ceramic materials exhibiting both excellent creep resistance and enhanced strength and toughness and to provide a metal extrusion process employing such dies.

Other objects and advantages of the invention will become apparent from the following description thereof.

SUMMARY OF THE INVENTION

The present invention provides metal forming dies, or other tooling for the high-temperature shaping of metals, composed of a strong refractory composite ceramic material. The composite material is a whisker-reinforced cordierite-containing material exhibiting good strength and toughness at high temperatures, as well as chemical compatibility and stability in contact with nonferrous alloys such as copper alloys at the temperatures required for extrusion or other reshaping of such metals. Most importantly, the composite exhibits unexpectedly high creep resistance as evidenced by excellent retention of shape and dimensions under the severe conditions of metal extrusion.

Broadly defined, the ceramic metal-forming tools or elements of the invention are formed of a whisker-reinforced crystalline body which will consist essentially of about 5–35 weight percent of silicon carbide whiskers as a reinforcing phase, with the remaining 65–95 weight percent of the material consisting of a crystalline matrix wherein the predominant crystal phase is cordierite or barium-stuffed cordierite. Barium-stuffed cordierites operable as the crystalline matrix are those having an approximate crystal composition of $xBaO \cdot 4MgO \cdot (4+x)Al_2O_3 \cdot (10-2x)SiO_2$, wherein the value of x ranges up to about 0.5, preferably from about 0.1 to about 0.5. For unmodified cordierite ($Mg_2Al_4Si_5O_{18}$) barium is not present and x has a value of zero.

Oxide compositions which may be processed to form cordierite and barium-stuffed cordierite compositions in accordance with the invention may consist essentially, in weight percent, of about 0–12% BaO, 12–14% MgO, 34–40% $Al_2O_3$, and 36–52% $SiO_2$. The barium stuffing level will of course depend on the amount of BaO present in the oxide composition.

The metal forming elements composed of these materials in accordance with the invention could comprise tool facings, such as facings on metal-forming rollers or the like, or more preferably dies or die parts for the extrusion of metal rod, tubing or other shapes from metal billets. An example is a composite ceramic extrusion die nib consisting of a composite ceramic body portion through which is provided an orifice of selected size and configuration for metal extrusion. The composite ceramic used for such a die part in accordance with the invention exhibits good oxidation resistance, excellent creep resistance, acceptable toughness, and chemical compatibility with nonferrous metal alloys under extrusion conditions at 700°–900° C.

DESCRIPTION OF THE DRAWING

The invention may be further understood by reference to the appended drawing, wherein.

DETAILED DESCRIPTION

Currently, a commonly used ceramic material for the fabrication of metal-forming tooling such as metal extrusion dies has been a stabilized zirconia ceramic material. This material is formed by the addition of minor quantities of magnesia (MgO), yttria ($Y_2O_3$) or other suitable oxides to a zirconium oxide batch material, followed by sintering of the mixture at high temperature to form a unitary body.

For use in metal extrusion at temperatures in the 700°–900° C. range useful for forming non-ferrous metals such as copper alloys, the ceramic extrusion die material must exhibit a toughness in excess of 4 MPa $(m)^{\frac{1}{2}}$ and must exhibit a modulus of rupture strength well in excess of 138 MPa (20,000 psi). Such properties can be developed in the aforementioned stabilized zirconia ceramics provided sufficient care is taken in selecting suitable zirconia batch materials and processing the green ceramic bodies to obtain optimum toughening of the material. However, manufacturing problems such as MgO vaporization and consequent phase destabilization at the surfaces of zirconia products remain as obstacles to achieve consistent performance.

Figure 1:
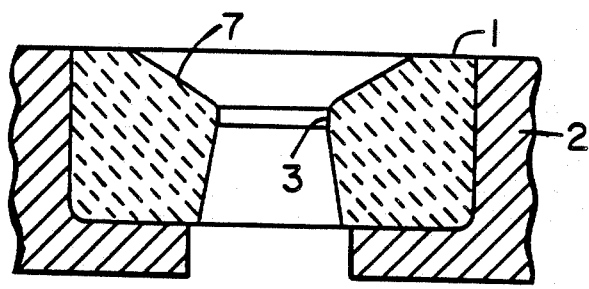
FIG. 1 is a schematic view in cross-section of a metal extrusion die useful in accordance with the invention.

FIG. 1 of the drawing shows a conventional design for a ceramic extrusion die and metal die holder useful for the extrusion of non-ferrous metals at temperatures of 700°–900° C. In this schematic, cross-sectional view, the ceramic die 1 is a cylindrical member with a central bore which includes, centrally of the bore opening, a sidewall portion or throat 3 that defines a generally circular cross-sectional opening or bearing through which a selected metal can be extruded. The entrance to the throat portion is defined by a generally conical opening 7 above the throat. Metal holder 2 provides an interference fit against the periphery of ceramic die 1 and thus support for the die in use, so that it can withstand the substantial pressures applied at high temperatures during metal extrusion operations.

At present, the most common failure mode for ceramic dies to be used for non-ferrous metal extrusion is the formation of throat checks, i.e., radial cracks emanating at the surface of the throat and extending into the die body, which, if large enough, result in the formation of radial fins on extruded rod or tubing. Throat checks would be expected to occur more easily with lower thermal expansion die materials, due to a decrease in the hoop stress exerted on the die by the steel case.

In accordance with the present invention, a relatively narrow range of ceramic matrix compositions in the field of cordierite and barium-stuffed cordierites, suitably reinforced with silicon carbide whiskers, has been found to exhibit unexpected utility for use in the extrusion of non-ferrous metals at temperatures above 700° C. These materials appear to exhibit the requisite strength and toughness for use in metal extrusion despite somewhat lower thermal expansion than zirconia and, more importantly, show surprising creep resistance under the extrusion conditions presently used for these metals. The barium-stuffed cordierites constitute particularly preferred matrix materials in accordance with the invention, and the following discussion refers more specifically to this family of materials even though the invention is not limited thereto. Whisker-reinforced barium-stuffed cordierite glass-ceramics are known from the aforementioned Chyung et al. patent application. An example of a material disclosed in that patent is a composite ceramic product comprising 25 volume percent (30 weight percent) of silicon carbide whiskers and a barium-stuffed cordierite matrix. The cordierite matrix described was one wherein the barium occupied half of the available stuffing sites.

Such a matrix can be conveniently referred to as half-stuffed cordierite. For the purpose of providing the preferred ceramic for metal extrusion in accordance with the present invention, compositions near half-stuffed barium cordierite are used as the matrix supporting the SiC whiskers. The whisker content will preferably range from about 20–30 weight percent, and the barium stuffing level will be such that x has a value in the range of about 0.4–0.5 in the above-referenced crystal composition.

The preparation of ceramic articles from these materials follows the procedure disclosed in the aforementioned Chyung et al. application. Briefly a barium-magnesium containing aluminosilicate glass of the composition required to obtain the necessary balance between these two alkaline earth oxides is first melted and converted to fine glass powder, and the desired concentration of silicon carbide whiskers is uniformly dispersed therein. Thereafter, the powdered glass-whisker mixture is shaped to an article or preform of a preselected configuration and hot-pressed at a temperature sufficient to crystallize the glass to barium-stuffed cordierite, and to consolidate the mixture to near-theoretical density. The hot pressing process is carried out at a temperature below the liquidus of the glass, e.g. not exceeding about 1400° C., in order to promote complete crystallization of the glass and the corresponding elimination from the final product of glassy phases which might lower the creep resistance of the material at high temperature.

Since silicon carbide whiskers are customarily supplied in dry form as an agglomerated powder, the preferred technique for homogeneously intermixing the whiskers with the powdered glass is to first disperse the whiskers in a liquid medium such as water or an alcohol solvent, and to thereafter blend the resulting dispersion with a slurry of the powdered glass likewise suspended in a compatible liquid. Using this approach, homogeneous blending of the whiskers and powdered glass can be conveniently accomplished, and the liquid vehicle can subsequently be removed from the solids to provide a dry homogeneous mixture.

Various means including dry pressing, extrusion, injection molding, hot pressing, and hot isostatic pressing may be used to form the mixture of whiskers in glass powder into a green body and to convert it under pressure to a dense ceramic product wherein the glass has been completely converted to the desired barium-stuffed cordierite phase. For the purpose of providing metal-forming elements in accordance with the present invention, the preferred practice is to form a green ceramic preform with an exterior configuration approximating that needed for the required extrusion die or other tool. This can be done by slip casting or molding of a liquid or plastic whisker-powdered glass mixture, with the resulting green preform thereafter being converted to a ceramic preform by hot isostatic pressing. The preform resulting from this processing can then be readily machined to final dimensions for the desired extrusion die or other tooling.

The utility of silicon carbide-reinforced barium-stuffed cordierite ceramics for metal extrusion applications is somewhat unexpected in view of the modest room temperature toughness and modulus of rupture strengths exhibited by these materials. It had previously been determined that these materials could exhibit modulus of rupture strengths on the order of 51,000 psi with toughnesses on the order of 5.1 MPa(m)$^{\frac{1}{2}}$ at ambient temperatures. These characteristics, however, did not compare favorably with strength and toughness values exhibited by commercially available stabilized zirconia ceramics for metal extrusion applications, materials of the latter type being readily available with modulus of rupture strengths in the range of 71-76,000 psi and toughness at ambient temperature in the range 9.2-13.6 MPa(m)$^{\frac{1}{2}}$.

Moreover, as previously noted, these materials are relatively low in thermal expansion, and presumably retain residual glass due to the use of a glass-ceramic material in the production thereof. Nevertheless, whisker-reinforced stuffed cordierite glass-ceramics have been found to exhibit unexpected durability and excellent creep resistance under the conditions of non-ferrous metal extrusion at temperatures of 700-900° C., as shown by the following example.

EXAMPLE 1

A batch for a glass which is thermally crystallizable to barium-stuffed cordierite is prepared for melting. The batch is formulated to yield, in parts by weight on the oxide basis, approximately 43.66 parts $SiO_2$, 37.11 parts $Al_2O_3$, 13.03 parts MgO, 6.2 parts BaO, and 0.70 parts $As_2O_3$ as a fining agent. The batch is formulated, ballmilled, and melted in a platinum crucible, after which it is run as a fine stream of molten glass into water to produce a fritted glass which can readily be dried and ground to particles having an average particle size of less than about 10 microns.

To produce a ceramic batch material for the production of a silicon carbide whisker composite incorporating this glass, silicon carbide whiskers (3 grams) are added to a water-isopropanol vehicle to form a thin slurry, the vehicle comprising 25 volume percent isopropanol and the remainder water, and this slurry is blended at high speed for 5 minutes to deagglomerate the silicon carbide whiskers and to produce a uniform suspension thereof. Thereafter, approximately 7 grams of powdered barium-magnesium aluminosilicate glass, produced as above described, is added to the whisker suspension, with high-speed blending thereafter being continued for an additional 5 minutes.

The resulting glass-whisker suspension is then vacuum filtered on a Buechner funnel to remove the vehicle and provide a dry batch mixture. This sequence of steps is repeated until an amount of dry batch sufficient to form a ceramic extrusion die body is provided.

The dry batch thus provided is charged into a graphite mold for an extrusion die body which includes a molybdenum foil liner. The mold is then transferred to a resistance-heated press and the glass-whisker mixture is consolidated under nitrogen according to a heat-pressure cycle which comprises heating the mold to 1400° C. at 1500 psi pressure and maintaining it at that temperature for 30 minutes, followed by cooling under pressure to 1300° C. and maintaining at that temperature for an additional 60 minutes. Thereafter the mold and contents are cooled to room temperature and the sintered ceramic product is removed from the mold and machined to form an extrusion die with a cylindrical bore generally as illustrated in FIG. 1.

Examination of control samples of the ceramic composite material produced as described indicate room temperature modulus of rupture strengths of 59,000 psi with room temperature fracture toughnesses of 5.8 MPa.m$^{\frac{1}{2}}$. The room temperature thermal expansion of the material is about $21 \times 10^{-7}$ °C./° C., with retained strength at 1200° C. being 31,000 psi.

The extrusion die thus provided is employed in the extrusion of non-ferrous alloy rod at a temperature of approximately 750° C. and an extrusion pressure on the order of 200,000 psi. In the extrusion process, a billet of a copper-beryllium alloy, commercially available as Alloy 25, is processed into alloy rod. The alloy billet is approximately 5 inches in diameter and 30 inches long, and is to be extruded to form half inch diameter circular rod. For this purpose, the extrusion die is seated in a tool steel die holder which provides a compressive interference fit and physical support for the die in the extrusion process. The die is examined periodically between extrusion runs to evaluate wear effects caused by the extrusion process.

Whereas throat checks commonly appear in some commercial zirconia extrusion dies immediately after the extrusion of the first alloy billet through the die, no such throat checking was observed after the first extrusion in the case of the composite die of the example. After 5 billets had been extruded through the die, some spalling on the die face was noted, but failure of the die did not occur. After the extrusion of approximately 34 billets, heat checking was noted on the surface of the extruded rod; however, no throat checking was observed, and the heat checking was eliminated by reducing the temperature on the extruder.

Catastrophic failure of the steel die holder occurred in the course of extruding the 84th alloy billet. This resulted in the failure of the die by stress fracture. At this point, the extrusion die did evidence radial cracks, as did the die holder. However, the die exhibited sufficiently good wear characteristics that recasing would have been carried out had the die not broken during the failure of the die holder.

Based on this performance, the whisker-reinforced cordierite die appeared to offer a significant performance advantage over some of the commercial stabilized zirconia dies previously utilized for the extrusion of the same copper alloy. For example, under similar extrusion conditions Code 1027 stabilized zirconia dies commercially available from Corning Glass Works, Zircoa Products, Solon, OH, were typically found to fail through throat checking at 48-60 billets extruded, even though the room temperature strength and toughness of the stabilized zirconia utilized in the production of these dies well exceeded that of the composite whisker-reinforced barium-stuffed cordierite dies of the invention.

Careful attention to both composition and processing, however, are required in order to provide a composite material exhibiting sufficient strength and toughness for use as an extrusion die material in accordance with the invention. Table 1 below reports several different stuffed cordierite matrix materials used to provide cordierite-whisker composites generally in accordance with the foregoing Example 1. Included in the Table for each of the compositions is the approximate oxide composition, in parts by weight as calculated from the batch, for the glass, the processing to which the silicon carbide whisker/powdered glass mixtures were subjected to convert batches thereof to whisker-reinforced ceramic products, and the physical properties of the ceramic products produced from this processing.

TABLE 1

|  | 1(Ba) | 2(Ba) | 3(K) | 4(Ba) |
|---|---|---|---|---|
| Composition |  |  |  |  |
| $SiO_2$ | 43.66 | 45.50 | 46.00 | 43.66 |
| $Al_2O_3$ | 37.11 | 36.60 | 34.00 | 37.11 |
| MgO | 13.03 | 13.20 | 14.90 | 13.03 |
| BaO | 6.20 | 4.70 | — | 6.20 |
| $K_2O$ | — | — | 4.70 | — |
| $As_2O_3$ | 0.70 | 0.50 | — | — |
| Processing | 1400° C.- | 1400° C.- | 1400° C.- | 1400° C.- |
|  | 30 m | 30 m | 30 m | 30 m |
| (@ 1500 psi) | 1300° C.- | 1300° C.- | 1300° C.- |  |
|  | 60 m | 60 m | 60 m |  |
| Physical Properties |  |  |  |  |

TABLE 1-continued

|  | 1(Ba) | 2(Ba) | 3(K) | 4(Ba) |
|---|---|---|---|---|
| MOR(Ksi) @ 25° C. | 59.0 | 58.4 | 29.4 | 44.8 |
| MOR(Ksi) @ 1200° C. | 31.0 | 22.8 | — | 28.5 |
| $K_{IC}(MPa \cdot m^{\frac{1}{2}})$ @ 25° C. | 5.5 | 6.0 | 3.0 | 5.1 |

Referring generally to the sample materials reported in Table 1, thermal processing for all samples was carried out by hot-pressing under a pressure of 1500 psi, and all glasses were fritted and formed into powders having particle sizes not exceeding about 10 microns prior to dispersion with silicon carbide whiskers in a water-isopropanol vehicle, as described previously in Example 1. In each case, whisker concentrations of 30 weight percent were used to form the composites, the whiskers comprising SC-9 grade silicon carbide whiskers obtained from the ARCO Chemical Company.

Three of the products described in Table 1 are based on barium-stuffed cordierite glass ceramics; Examples 1 and 4 correspond to ½-stuffed barium cordierite (x having a value of about 0.5 in the above referenced Ba-stuffed cordierite crystal composition), while Example 2 has a composition providing ⅜-stuffed barium cordierite (x=0.375). Example 3 is a potassium-stuffed cordierite matrix.

The physical properties of the ceramic products produced as described in Table 1 are critically dependent upon the starting composition of the glass ceramic and the thermal processing of the glass-whisker batches. Example 2 comprising the ⅜-stuffed barium cordierite matrix appears to exhibit adequate room temperature strength. However, its strength at 1200° C. is significantly less than in the case of the ½-stuffed barium cordierite matrix, such that the former material would not be expected to exhibit the high-temperature durability of the latter.

The processing of the samples also had an important effect on properties. For example, the processing of the ½-stuffed barium cordierite glass as a matrix material with silicon carbide whiskers at 1400° C. only, as in Example 4, produces a material which is inferior to the material of Example 1 with respect to both room temperature modulus of rupture strength and modulus of rupture strength at 1200° C. This result is most probably attributable to the retention of residual glass in the ceramic product of Example 4, due to incomplete crystallization of the glass-ceramic matrix.

The creep resistance of the ⅜-barium-stuffed ceramic product of Example 2 is also inferior to that of the ½-barium-stuffed composite of Example 1, a circumstance which would be expected to degrade the utility of the latter material for use as an extrusion die element. Hence the load deflection curve generated in the course of strength-testing the ⅜-barium-stuffed composite is non-linear, indicating a significant amount of plastic deformation of the ceramic at 1200° C. and suggesting substantial creep problems in use at this temperature. In contrast, the linear load deflection curve for the ½-barium-stuffed composite is essentially linear to 1200° C. Thus the ½-barium-stuffed matrix is superior to the 3/8-barium stuffed matrix for high temperature use.

The processing of these composite ceramics also has a critical effect on their high temperature properties. Particularly important is the peak processing temperature used to convert the glass-whisker batch material into the cordierite-whisker composite. For example, a composite having the composition of Example 1 of Table I, but hot pressed at 1475° C. rather than 1400° C., exhibited a residual glassy matrix and had lower modulus of rupture strength and toughness than the composite of Example 1. Further, the cordierite matrix of the sample processed at 1475° C. could not be properly crystallized even after prolonged subsequent crystallization treatments. This is in contrast to the processing shown for Example 1, which resulted in complete crystallization of the matrix and the essential elimination of residual glass, as shown by the linear load-deflection curve generated during the testing of that sample.

The volume fraction of whiskers incorporated in these composite materials also critically affects the strength and toughness thereof. The strength and toughness increase rapidly with whisker loadings of 20% by weight and above, this behavior continuing up to at least 30 weight percent of whisker reinforcement. However, at volume fractions above 30 weight percent, difficulty is encountered in achieving complete consolidation of the composites at the temperatures and pressures used. Therefore, whisker contents in the range of 20-30 weight percent are preferred in order to achieve the strength and toughness needed for metal extrusion applications.

Figure 2:
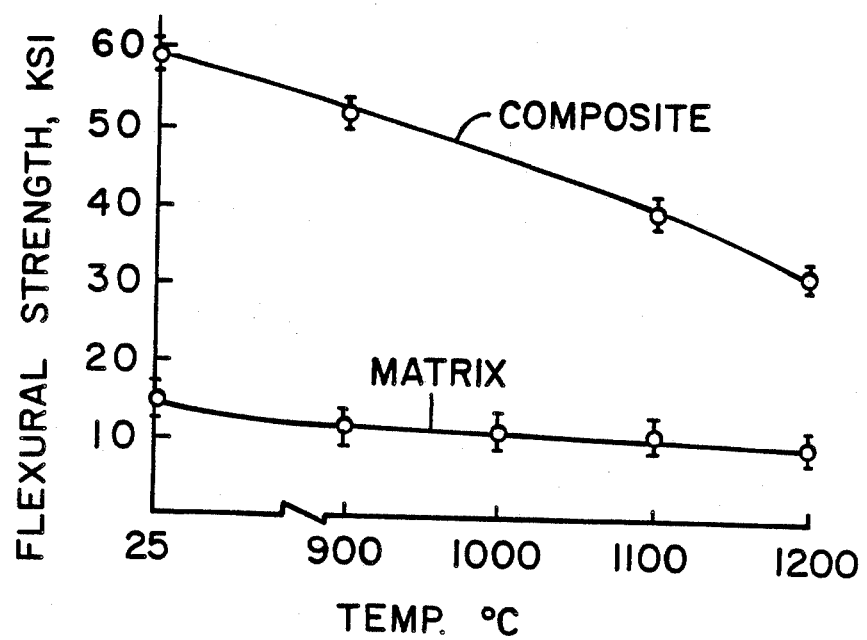
FIG. 2 is a graph plotting modulus of rupture as a function of temperature of a composite ceramic article provided in accordance with the invention.

The reasons for the unexpected durability of the whisker-reinforced composites of the invention under the conditions of metal extrusion are not fully understood. FIG. 2 of the drawing is a graph plotting variations in the flexural strengths of the composite stuffed cordierite-whisker material, and of the stuffed cordierite matrix alone, as a function of test temperature for flexural strength specimens of each material. The composite material exhibits a somewhat larger proportional reduction in strength than the matrix alone, a factor which may be due to the increasingly inelastic behavior of the matrix at higher temperatures, with a corresponding decrease in the efficiency of load transfer to the whisker reinforcement at the temperature. In addition, the thermal expansion coefficients of these composite materials (generally from $21 \times 10^{-7}/°$ C. increasing to $36 \times 10^{-7}/°$ C. over the range from 100° to 1000° C.) are somewhat lower than the corresponding values for 1027 stabilized zirconia materials (typically above $65 \times 10^{-7}/°$ C. average over the range 25°-1000° C.). This would reduce any hoop stress on the composite die exerted by the steel die holder under extrusion conditions, and might be expected to increase susceptibility to throat checking or cracking of the die.

While the foregoing discussion has centered upon the use of barium-stuffed cordierite/whisker composite ceramics for use in non-ferrous metal alloy extrusion, it will be appreciated that the characteristics of this material render it suitable for use in other metal forming or high stress applications where strength and toughness at elevated temperatures are required. Thus, the foregoing description is merely illustrative of the invention as it will be applied in practice, and numerous variations and modifications of the materials and procedures hereinabove described may be resorted to within the scope of the invention as defined by the appended claims.

We claim:

1. In a metal extrusion die for the extrusion of ferrous and non-ferrous alloys comprising a ceramic body incorporating an extrusion orifice therethrough for the extrusion of said alloys, the improvement wherein the die consists of a whisker-reinforced crystalline body consisting essentially of about 5-35 weight percent of SiC whiskers and 65-95 weight percent of a crystalline matrix, the predominant crystal phase in the crystalline matrix consisting of a crystal selected from the group consisting of cordierite and barium-stuffed cordierite.

2. A die in accordance with claim 1 wherein the crystalline matrix has an oxide composition, in weight percent, of about 0-12% BaO, 12-14% MgO, 34-40% $Al_2O_3$ and 36-52% $SiO_2$.

3. A die in accordance with claim 2 wherein the whisker-reinforced crystalline body consists essentially of 20-30% by weight of SiC whiskers and 70-80% by weight of a crystalline matrix, and wherein the predominant crystal phase present in the matrix has an approximate crystal composition: $xBaO.4MgO.(4+x)Al_2O_3.(10-2x)SiO_2$, wherein x ranges from zero up to about 0.5.

4. A die in accordance with claim 3 wherein the crystal phase present in the matrix consists essentially of barium-stuffed cordierite crystals of the formula: $xBaO.4MgO.(4+x)Al_2O_3.(10-2x)SiO_2$ wherein x ranges from about 0.4-0.5.

* * * * *